United States Patent
Mizuno et al.

[11] Patent Number: 6,065,443
[45] Date of Patent: May 23, 2000

[54] APPARATUS AND METHOD FOR CONTROLLING COMBUSTION IN STRATIFIED CHARGE COMBUSTION ENGINE

[75] Inventors: Hiroyuki Mizuno; Jun Takahashi, both of Toyota, Japan

[73] Assignee: Toyota Jidosha Kabushiki Kaisha, Toyota, Japan

[21] Appl. No.: 09/221,991

[22] Filed: Dec. 29, 1998

[30] Foreign Application Priority Data

Jan. 29, 1998 [JP] Japan .................................. 10-017156

[51] Int. Cl.[7] ............................. F02B 17/00; B60T 13/52; F02D 41/22
[52] U.S. Cl. ........................... 123/295; 123/436; 123/480; 477/206
[58] Field of Search .................................... 123/295, 399, 123/435, 436, 478, 480; 477/203, 205, 206

[56] References Cited

U.S. PATENT DOCUMENTS

| | | | |
|---|---|---|---|
| 5,846,164 | 12/1998 | Harada | 477/205 |
| 5,915,357 | 6/1999 | Harada et al. | 123/399 |
| 5,950,594 | 9/1999 | Mizuno | 123/295 |
| 5,950,595 | 9/1999 | Yoshioka et al. | 123/295 |

FOREIGN PATENT DOCUMENTS

| | | |
|---|---|---|
| 0 816 196 A2 | 1/1998 | European Pat. Off. . |
| 833044 | 1/1998 | European Pat. Off. . |
| 8-164840 | 6/1996 | Japan . |
| 10151971 | 6/1998 | Japan . |

*Primary Examiner*—Willis R. Wolfe
*Assistant Examiner*—Hieu T Vo
*Attorney, Agent, or Firm*—Oliff & Berridge, PLC

[57] ABSTRACT

An apparatus and method for controlling combustion of an engine. The engine has a throttle valve located in an intake duct connected to combustion chambers, and a brake booster actuated by vacuum supplied by the intake duct. During stratified charge combustion, if vacuum supplied to the brake booster is insufficient, an ECU decreases the opening of the throttle valve thereby increasing the vacuum. The ECU switches the combustion mode to stratified charge combustion if a target injection amount, which corresponds to load applied to the engine, is equal to or smaller than a predetermined value. When the target injection amount is greater than the value, the ECU switches the combustion mode to homogeneous charge combustion. During stratified charge combustion, the ECU sets the determination value to a smaller value when an operation for producing vacuum is performed than when the operation is not performed. This procedure improves fuel economy.

15 Claims, 12 Drawing Sheets

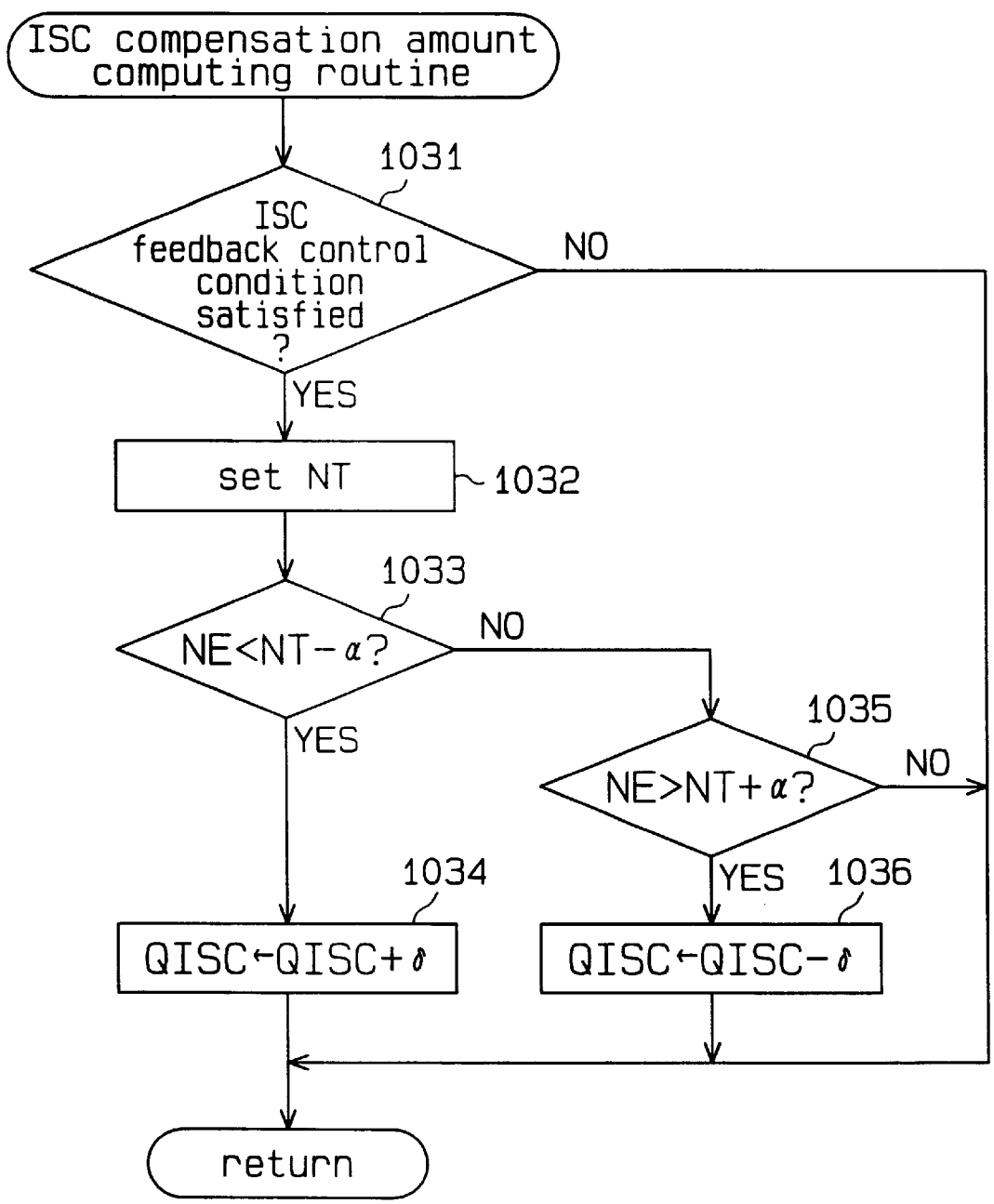

APPARATUS AND METHOD FOR CONTROLLING COMBUSTION IN STRATIFIED CHARGE COMBUSTION ENGINE

BACKGROUND OF THE INVENTION

The present invention relates to an apparatus and a method for controlling the combustion in stratified charge combustion engines. More particularly, the present invention pertains to an apparatus and a method for controlling the combustion in stratified charge combustion engines that are provided with brake boosters, which use vacuum pressure to improve braking force.

In a typical engine, fuel is injected into an intake port from a fuel injector. The fuel is then homogeneously mixed with air and sent into a combustion chamber through the intake port. An engine performing homogeneous charge combustion has a throttle valve arranged in its intake manifold. The size of the throttle valve opening is adjusted by manipulating an acceleration pedal to vary the amount of air supplied to the combustion chamber. This ultimately changes the amount of homogeneously mixed air and fuel. Engine power is controlled, accordingly.

However, homogeneous charge combustion produces strong vacuum in the intake manifold when the throttle valve throttles the intake manifold. The vacuum increases energy loss due to pumping, or pumping loss, which occurs when the air-fuel mixture is drawn into the combustion chamber through the intake port.

On the other hand, an engine capable of performing stratified charge combustion has been proposed. Stratified charge combustion is performed by injecting fuel directly into the combustion chamber such that the fuel is concentrated about the spark plug. Ignition by the spark plug burns the stratum of rich air-fuel mixture surrounding the spark plug. This, in turn, burns the stratum of lean air-fuel mixture surrounding the rich mixture. The power of a stratified charge combustion engine is basically controlled by adjusting the amount of fuel injected toward the vicinity of the spark plug. Accordingly, pumping loss is decreased since the throttle valve does not throttle the intake manifold. This improves the efficiency of the engine. Furthermore, stratified charge combustion improves fuel efficiency since the engine can be driven with a lean air-fuel mixture.

Japanese Unexamined Patent Publication No. 8-164840 describes an engine that performs stratified charge combustion. In this engine, each combustion chamber is provided with a homogeneous charge fuel injection valve and a stratified charge fuel injection valve. The homogeneous charge injection valve homogeneously disperses fuel into the combustion chamber and the stratified charge injection valve injects fuel toward the vicinity of the ignition plug. When the engine load is small, fuel is injected from the stratified charge injection valve. Thus, the fuel is supplied in a concentrated manner about the ignition plug. In this sate, stratified charge combustion is performed with the throttle valve opened slightly wider than when homogeneous charge combustion is performed.

This engine is also provided with a brake booster that increases the braking force thereby decreasing the required force for depressing the brake pedal. The brake booster uses vacuum, which is produced in the intake manifold downstream of the throttle valve, as a drive source. Specifically, the brake booster is connected to the downstream side of the throttle valve by a pipe. The pipe communicates vacuum to the brake booster. The communicated vacuum acts on a diaphragm incorporated in the brake booster and increases the force actuating the brake. The force of the communicated vacuum corresponds to the degree of depression of the brake pedal.

However, in a stratified charge combustion engine, the throttle valve is normally not throttled during stratified charge combustion. Therefore, the pressure in the intake manifold is not lowered, and there is insufficient vacuum available for braking. In the engine of the above publication, the opening of the throttle valve is decreased if there is not sufficient vacuum for actuating the brake booster during stratified charge combustion. As a result, the pressure in the intake manifold is lowered and sufficient vacuum is produced to actuate the brake booster.

Decreasing the opening of the throttle valve during stratified charge combustion decreases the amount of air supplied to the combustion chamber compared to decreasing the valve opening during normal stratified charge combustion. The decreased intake air amount enriches the air-fuel mixture in the vicinity of the spark plug. If the amount of injected fuel is increased due to increased engine load in this state, the mixture in the vicinity of the spark plug becomes too rich with less fuel compared to a case where the throttle valve opening is not decreased. This destabilizes fuel combustion and increases the specific fuel consumption of the engine.

SUMMARY OF THE INVENTION

Accordingly, in a stratified charge combustion engine having a brake booster that uses vacuum to guarantee braking force, it is an objective of the present invention to stabilize combustion when vacuum is being produced thereby improving the specific fuel consumption of the engine.

To achieve the foregoing and other objectives and in accordance with the purpose of the present invention, an apparatus for controlling combustion in an engine that produces power by burning a mixture of air and fuel in a combustion chamber is provided. The engine performs a combustion mode selected from a plurality of combustion modes. The combustion modes are stratified charge combustion, in which the mixture is distributed in a concentrated manner in the combustion chamber, and homogeneous charge combustion, in which the mixture is distributed in a homogeneous manner in the combustion chamber. The apparatus includes an intake passage, vacuum producing means, a brake booster and a controller. The intake passage is connected to the combustion chamber to supply air to the combustion chamber. The vacuum producing means lowers the pressure in the intake passage. The brake booster is actuated by vacuum pressure of the intake passage to apply supplemental braking force. During stratified charge combustion the vacuum producing means lowers the pressure in the intake passage if the vacuum pressure acting on the brake booster is higher than a predetermined value. The controller switches the combustion mode in accordance with the load applied to the engine. The controller changes the combustion mode to stratified combustion mode when the engine load is equal to or smaller than a predetermined determination value and changes the combustion mode to homogeneous charge combustion when the engine load is greater than the determination value. The controller sets the determination value to a smaller value during stratified charge combustion when the vacuum producing means is operating than when the vacuum producing means is not operating.

The present invention also provides another apparatus that has the same structure as the above apparatus except for its controller. That is, the controller switches the combustion mode from stratified charge combustion to homogenous charge combustion in accordance with an increase in the load applied to the engine. While the vacuum producing means is operating and stratified charge combustion is being performed, the controller changes the combustion mode to homogeneous charge combustion if the air-fuel ratio of the mixture in the combustion chamber becomes lower than a predetermined value.

Further, the present invention provides a method for controlling combustion in an engine that produces power by burning a mixture of air and fuel in a combustion chamber. The engine performs a combustion mode selected from a plurality of combustion modes, the combustion modes being stratified charge combustion, in which the mixture is distributed in a concentrated manner in the combustion chamber, and homogeneous charge combustion, in which the mixture is distributed in a homogeneous manner in the combustion chamber. The method includes the steps of supplying air from an intake passage to the combustion chamber, boosting brake power with vacuum pressure from the intake passage, temporarily performing an operation to reduce the pressure in the intake passage if, during stratified charge combustion, the vacuum pressure is higher than a predetermined value, switching the combustion mode in accordance with the load applied to the engine, wherein when the engine load is equal to or smaller than a predetermined determination value, the combustion mode is switched to stratified charge combustion, and when the engine load is greater than the determination value, the combustion mode is switched to homogenous charge combustion, and setting the determination value to a smaller value during stratified charge combustion when the pressure reducing operation is being performed than when the pressure reducing operation is not being performed.

The present invention also provides another method that has the same procedure as the above method except for the following steps. That is, the method includes the steps of switching the combustion mode from stratified charge combustion to homogeneous charge combustion in accordance with an increase in the load applied to the engine, and switching the combustion mode, while the pressure reducing operation is being performed and stratified charge combustion is being performed, to homogeneous charge combustion if the air-fuel ratio of the mixture in the combustion chamber becomes lower than a predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 7 is a flowchart showing an ISC compensation amount computing routine executed by the ECU of the engine illustrated in FIG. 1;

DETAILED DESCRIPTION OF THE PREFERFED EMBODIMENTS

Figure 1:
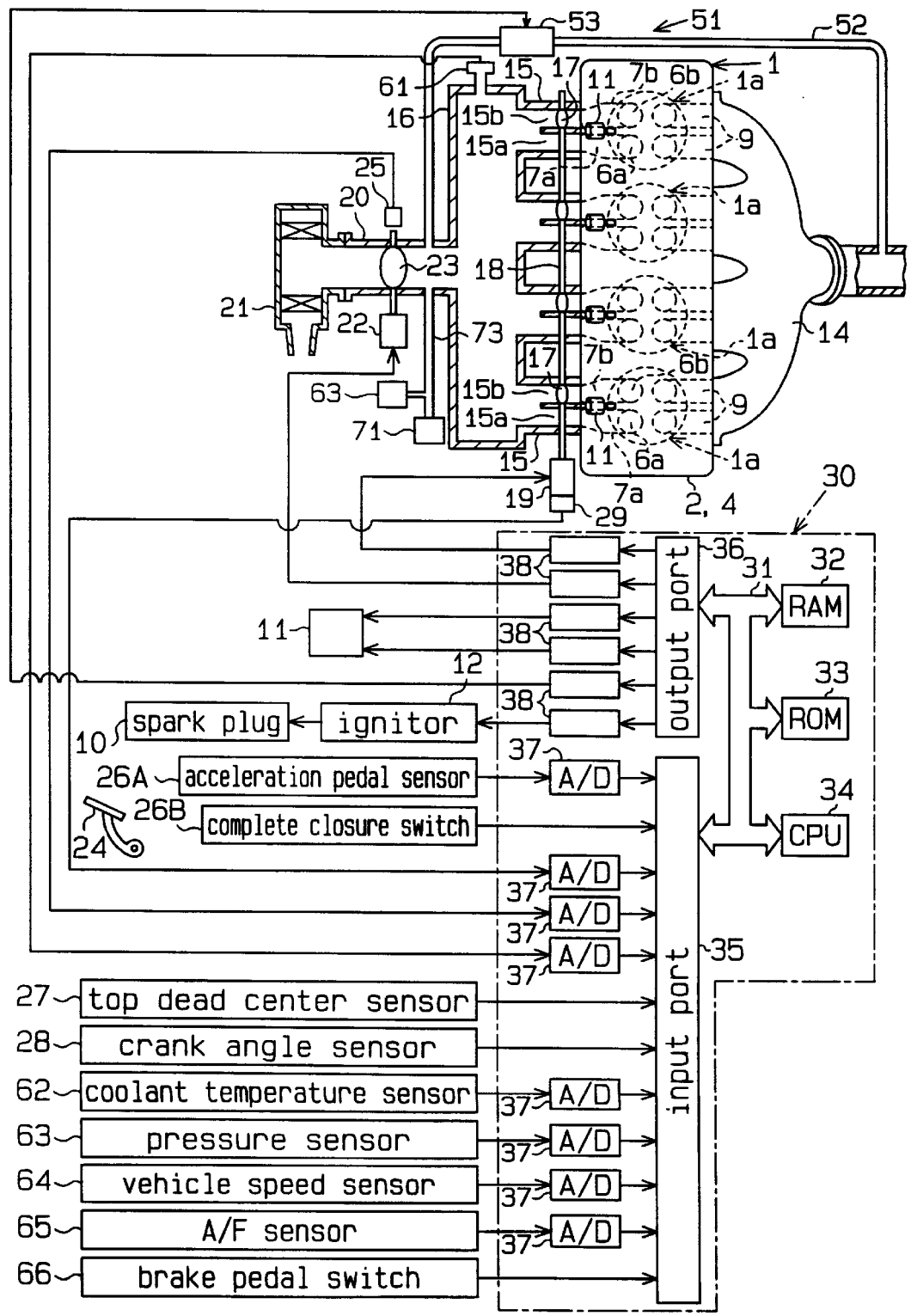
FIG. 1 is a diagram showing an apparatus for controlling the fuel combustion of a stratified charge combustion engine according to a first embodiment of the present invention.
Figure 2:
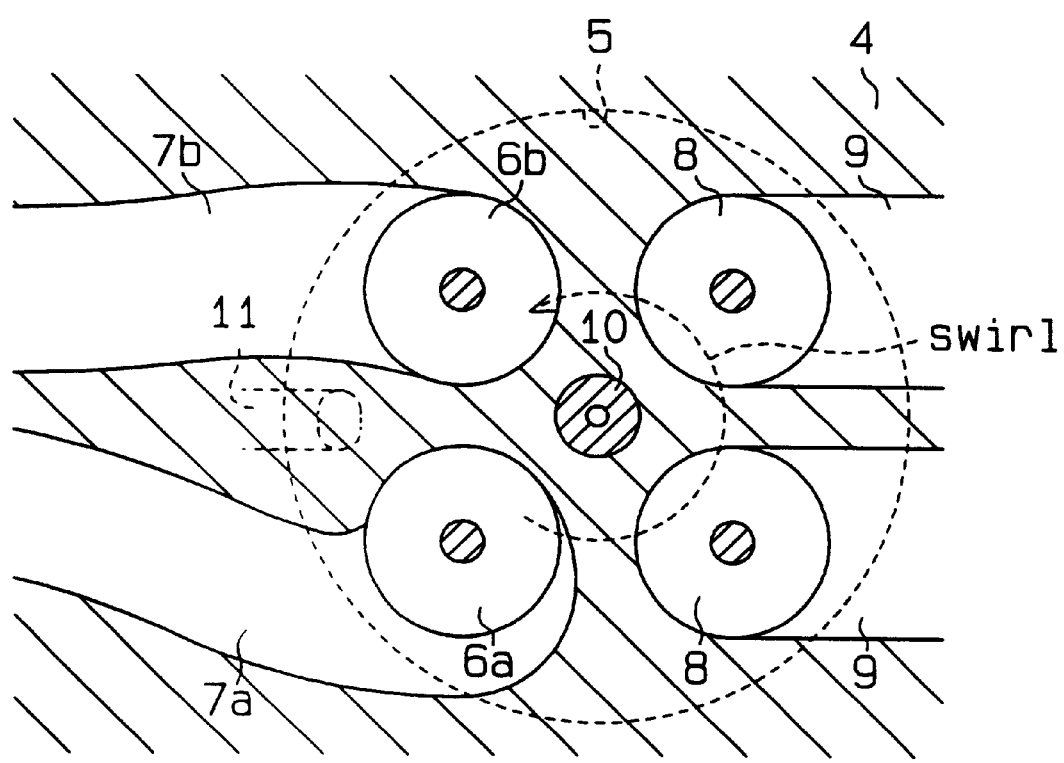
FIG. 2 is an enlarged cross-sectional view showing a cylinder of the engine illustrated in FIG. 1.

A first embodiment according to the present invention will now be described with reference to FIGS. 1 to 8. FIG. 1 illustrates an engine 1 employed in a vehicle. The engine 1 is provided with four cylinders 1a defined in a cylinder block 2. The structure of the combustion chamber of each cylinder 1a is shown in FIG. 2. Each cylinder 1a reciprocally houses a piston. A cylinder head 4 is arranged on top of the cylinder block 2. A combustion chamber 5 is defined between each piston and the cylinder head 4. Four valves are provided for each cylinder 1a. The four valves include a first intake valve 6a, a second intake valve 6b, and two exhaust valves 8. The first intake valve 6a is arranged in correspondence with a first intake port 7a, while the second intake valve 6b is arranged in correspondence with a second intake port 7b. In the same manner, each of the two exhaust valves 8 is arranged in correspondence with an exhaust port 9. The first and second intake ports 7a, 7b and the two exhaust ports are defined in the cylinder head 4.

As shown in FIG. 2, the first intake port 7a is a helical port that extends in a helical manner. The second intake port 7b extends in a generally straight manner. A spark plug 10 is arranged in correspondence with each combustion chamber 5 at the middle section of the cylinder head 4. High voltage is applied to the spark plugs 10 by an ignitor 12 through a distributor (not shown). The ignition timing of each spark plug 10 is determined by the output timing of the high voltage sent from the ignitor 12. A fuel injector 11 is arranged in the vicinity of each set of first and second intake valves 6a, 6b on the inner wall of the cylinder head 4. The fuel injector 11 injects fuel directly into the combustion chamber 5 of the associated cylinder 1a.

In this embodiment, each injector 11 directly injects fuel into the associated cylinder 1a when either stratified charge combustion or homogeneous charge combustion is performed. When stratified charge combustion is performed, the injector 11 injects fuel into the combustion chamber 5 at the final stage of each compression stroke. The injected fuel is supplied in a concentrated manner about the ignition plug 10 and is burned. At this time, a throttle valve 23, which will be discussed below, is opened wider than when homogeneous charge combustion is performed. When homogeneous charge combustion is performed, on the other hand, the injector 11 injects fuel into the combustion chamber 5 during the intake stroke of the associated piston. The injected fuel is homogeneously mixed with air introduced into the combustion chamber 5 from the intake ports 7a, 7b and is burned.

As shown in FIG. 1, the first and second intake ports 7a, 7b of each cylinder 1a are connected to a surge tank 16 by a first intake passage 15a and a second intake passage 15b, respectively. The first and second intake passages 15a, 15b extend through an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30. Alternatively, the swirl control valves 17 may be driven by vacuum in the associated first and second intake ports 7a, 7b instead of by the step motor 19.

The surge tank 16 is connected to an air cleaner 21 through an intake duct 20. A throttle valve 23, which is opened and closed by a step motor 22, is arranged in the intake duct 20. The step motor 22 and the throttle valve 23 function as vacuum producing means. The ECU 30 sends signals to drive the step motor 22 for opening and closing the throttle valve 23. The throttle valve 23 adjusts the amount of intake air that passes through the intake duct 20 and enters the combustion chambers 5. Accordingly, the vacuum in the intake duct 20 is adjusted. The intake duct 20, the surge tank 16, the first intake passage 15a and the second intake pipe 15b constitute an intake passageway. A throttle sensor 25 is arranged in the vicinity of the throttle valve 23 to detect the size of the opening (throttle angle TA) of the valve 23.

The exhaust ports 9 of each cylinder 1a are connected to an exhaust manifold 14. The exhaust gas resulting from combustion of the air-fuel mixture in the combustion chamber 5 is sent to an exhaust duct through the exhaust manifold 14.

The engine 1 is provided with a conventional exhaust gas recirculation (EGR) mechanism 51 that includes an EGR passage 52 and an EGR valve 53, which is arranged in the EGR passage 52. The EGR passage 52 communicates the intake duct 20, which is located at the downstream side of the throttle valve 23, with the exhaust duct. The EGF valve 53 includes a valve seat, a valve body, and a step motor (none of which is shown). The step motor displaces the valve body with respect to the valve seat to alter the opening of the EGR valve 53. When the EGR valve 53 opens, some of the exhaust gas sent into the exhaust duct flows into the intake duct 20 though the EGR passage 52. In other words, some of the exhaust gas is recirculated to the intake air by the EGR mechanism 51. The recirculation amount of the exhaust gas is controlled by the EGR valve 53.

Figure 3:
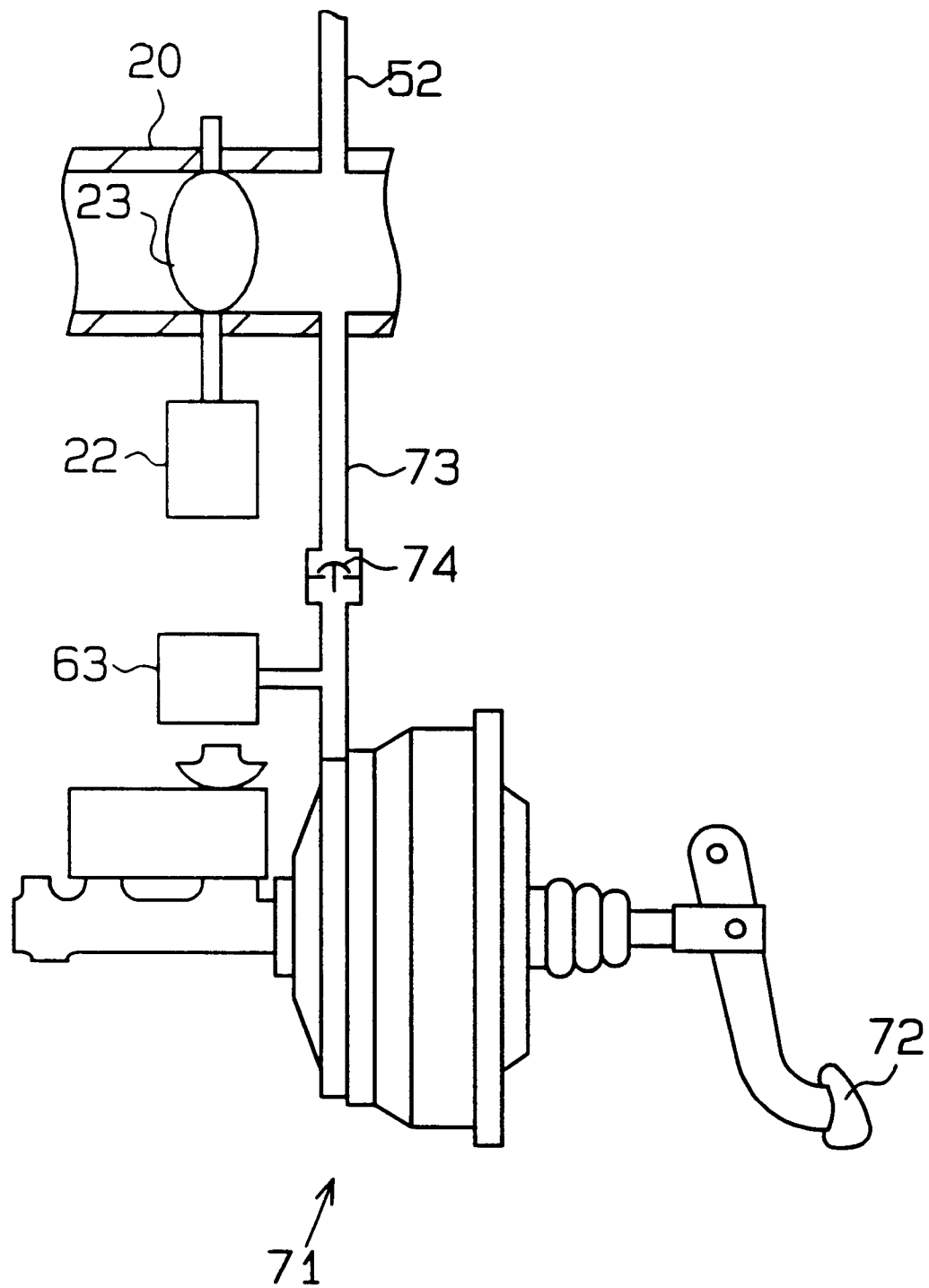
FIG. 3 is a schematic drawing, partly cross sectional, showing the brake booster of the engine illustrated in FIG. 1.

As shown in FIGS. 1 and 3, a brake booster 71 for enhancing the braking force of the vehicle is connected to the intake duct 20. The brake booster 71 increases the force applied by the brake pedal 72. The boosted brake pedal force is converted into hydraulic pressure and used to actuate brake actuators (not shown) provided for each wheel. The brake booster 71 is connected to the downstream side of the throttle valve 23 in the intake duct 20 by a connecting pipe 73 and is actuated by vacuum produced in the duct 20.

The brake booster 71 includes a diaphragm (not shown) inside. One side of the diaphragm receives the atmospheric pressure, whereas the other side receives vacuum in the intake duct 20 through the connecting pipe 73. A check valve 74 is located in the pipe 73. The check valve 74 is opened by vacuum in the intake duct 20. A pressure sensor 63 is coupled to the connecting pipe 73 to detect the pressure PBK (absolute pressure) in the brake booster 71.

The ECU 30 is a digital computer provided with a random access memory (RAM) 32, a read only memory (ROM) 33, a central processing unit (CPU) 34, which is a microprocessor, an input port 35 and an output port 36. A bidirectional bus 31 connects the RAM 32, the ROM 33, the CPU 34, the input port 35, and the output port 36 to one another.

An acceleration pedal 24 is connected to an acceleration pedal sensor 26A. When the driver depresses the acceleration pedal 24, the acceleration pedal sensor 26A generates voltage proportional to the degree of depression, or position, of the acceleration pedal 24. Thus, the output voltage of the acceleration pedal sensor 26A corresponds to the acceleration pedal position value ACCP. The voltage of the acceleration pedal sensor 26A is transmitted to the input port 35 by way of an analog to digital (A/D) converter 37. A complete closure switch 26B is located near the acceleration pedal 24 to detect when the pedal 24 is not depressed at all. The closure switch 26E outputs a complete closure signal XIDL of one when the acceleration pedal 24 is not depressed and outputs a complete closure signal XIDL of zero when the acceleration pedal 24 is depressed. These signals are sent to the input port 35.

A top dead center sensor 27 generates a pulse signal when, for example, the piston in the first cylinder 1a reaches its top dead center position during the intake stroke. A crank angle sensor 28 generates a pulse signal each time a crankshaft of the engine 1 is rotated, for example, by a crank angle CA of thirty degrees. The pulse signals generated by the top dead center sensor 27 and the crank angle sensor 28 are sent to the CPU 34 by way of the input port 35. Based on these signals, the CPU 34 obtains the engine speed NE.

A swirl control valve sensor 29 detects the rotational angle of the shaft 18 to obtain the opening angle, or position, of the swirl control valves 17. The swirl control valve sensor 29 then generates a signal corresponding to the detected angle and sends the signal to the input port 35 by way of an A/D converter 37. The throttle sensor 25 detects the throttle angle TA. The throttle sensor 25 then generates a signal corresponding to the detected throttle angle TA and sends the signal to the input port 35 by way of an A/D converter 37.

An intake pressure sensor 61 is provided to detect the pressure in the surge tank 16 (intake pressure PM). A coolant temperature sensor 62 is provided to detect the temperature of the engine coolant (coolant temperature THW). A vehicle speed sensor 64 is provided to detect the speed of the vehicle (vehicle speed SPD). An air fuel ratio (A/F) sensor 65 is located in the exhaust duct to detect the air fuel ratio AFS. The sensors 61, 62, 64, 65 output signals based on detected values to the CPU 34 by way of corresponding A/D converters 37 and the input port 35. The pressure sensor 63 also outputs signals based on the pressure value it detects to the CPU 34 by way of an A/D converter 37 and the input port 35.

A brake pedal switch 66 is located rear the brake pedal 72 to detect when the pedal 72 is depressed. The pedal switch 66 outputs a brake signal WSTP of one when the brake pedal 72 is depressed and outputs a brake signal WSTP of zero when the brake pedal 72 is not depressed. These signals are sent to the input port 35.

The output port 36 is connected to the fuel injection injectors 11, the step motors 19, 22, the ignitor 12 and the EGR valve 53 (step motor) by way of drive circuits 38. The ECU 30 optimally controls the fuel injectors 11, the step motors 19, 22, the ignitor 12, and the EGP valve 53 with control programs stored in the ROM 33 based on signals sent from the sensors 25, 26a, 27–29, 61–65 and the switches 26B, 66.

Figure 4:
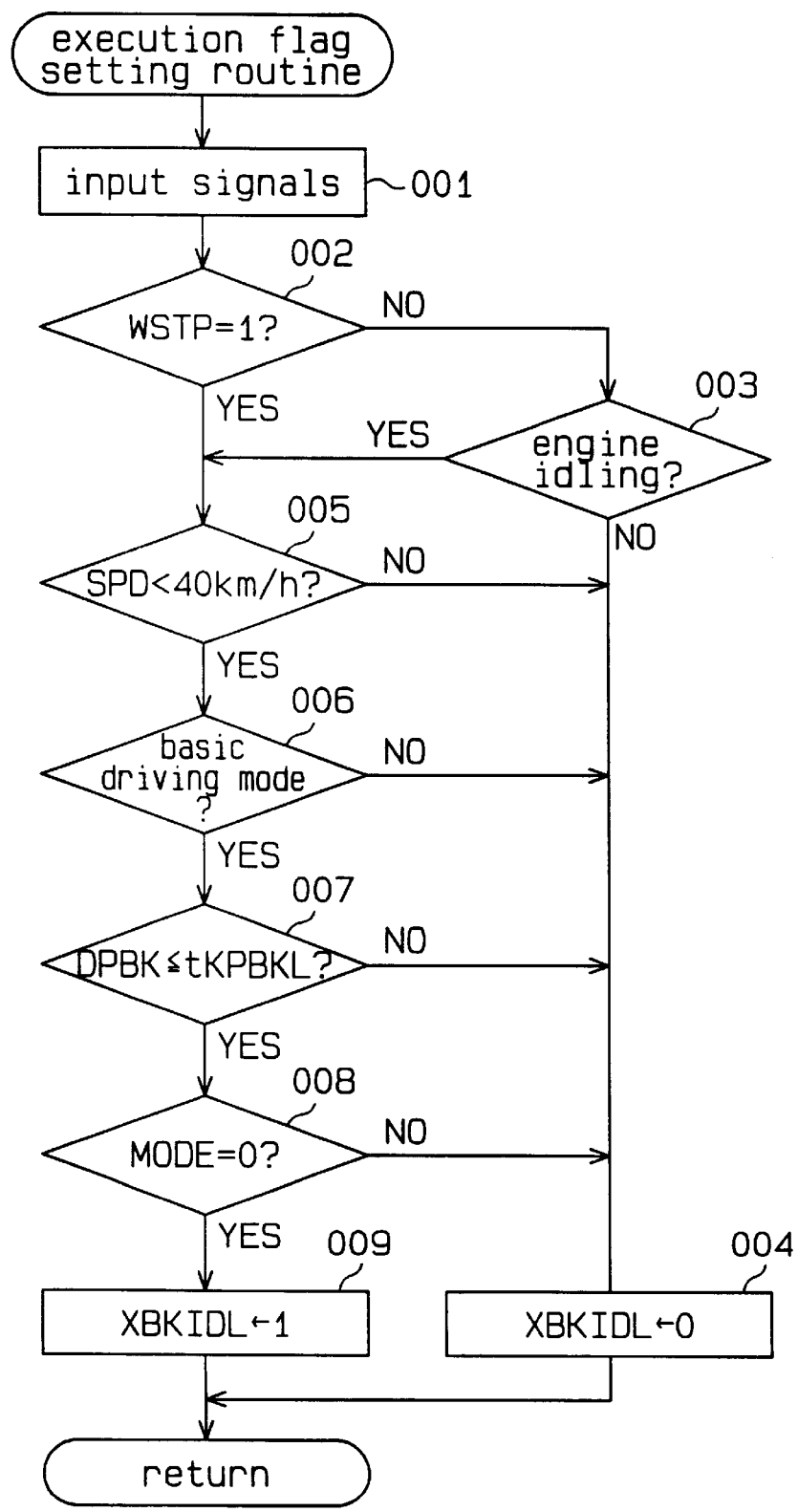
FIG. 4 is a flowchart showing an initiation flag setting routine executed by the ECU of the engine illustrated in FIG. 1.

Control programs executed by the combustion controlling apparatus of the engine 1 will now be described with reference to flowcharts. FIG. 4 is a flowchart showing an initiation flag setting routine. The ECU 30 executes the routine in an interrupting manner at predetermined crank angle increments. By executing this routine, the ECU 30 determines whether an operation to produce vacuum for actuating the brake booster 71 needs to be performed.

When entering the routine, the ECU 30 inputs signals from the sensors 25, 26a, 27–29, 61–65 and switches 26B, 66 at step 001.

At step 002, the ECU 30 determines whether the current brake signal WSTP is one. If the signal WSTP is zero, the ECU 30 judges that the brake pedal 72 is not currently depressed and moves to step 003.

At step 003, the ECU 30 judges whether the engine 1 is idling based on, for example, the complete closure signal XIDL inputted from the complete closure switch 26B at step 001. If the engine 1 is not idling, the ECU 30 moves to step 004. At step 004, the ECU 30 sets an initiation flag XBKIDL to zero and then temporarily terminates subsequent processing. The initiation flag XBKIDL is used for determining whether the operation to produce vacuum pressure for actuating the brake booster 71 needs to be started. The flag XBKIDL has a value of one when the operation needs to be performed and has a value of zero when the operation does not need to be performed.

If the brake signal WSTP is one at step 002 or if the engine 1 is idling at step 003, the ECU 30 moves to step 005. At step 005, the ECU 30 judges whether the current vehicle speed SPD is lower than a predetermined value (for example, 40 km/h). If the vehicle speed SPD is equal to or higher than the predetermined value, the ECU 30 determines that the operation to produce vacuum is not necessary and moves to step 004. At step 004, the ECU 30 sets the initiation flag XBKIDL to zero.

If the vehicle speed SPD is lower than the predetermined value, the ECU 30 moves to step 006 and judges whether the engine 1 is in a basic driving mode. The ECU 30 judges that the engine 1 is not performing the basic driving mode, for example, when the engine 1 is performing rich-spike control. Rich-spike control refers to a procedure for temporarily enriching the air-fuel ratio for reducing nitrogen oxide occluded in a catalyst, which is located in the exhaust duct, by using hydrocarbon thereby releasing the reduced nitrogen oxide as gaseous nitrogen. If the engine 1 is not in the basic driving mode, the ECU 30 judges that the vacuum producing operation is not necessary and moves to step 004. At step 004, the ECU 30 sets the initiation flag XBKIDL to zero. If the engine 1 is in the basic driving mode, the ECU 30 moves to step 007.

At step 007, the ECU 30 judges whether the vacuum DPBK, or the difference between atmospheric pressure and the pressure PBK in the brake booster 71, in the brake booster 71 is equal to or lower than a predetermined target value tKPBKL. In other words, the ECU 30 judges whether the vacuum for actuating the brake booster 71 is insufficient. If the vacuum DPBK is greater than the target value tKPBKL, the ECU 30 determines that the pressure PBK is sufficiently low and there is no need to produce vacuum. In this case, the ECU 30 moves to step 004 and sets the initiation flag XBKIDL to zero.

If the vacuum DPBK is smaller than the target value tKPBKL, the ECU 30 judges that the vacuum DPBK is not sufficient and moves to step 008. At step 008, the ECU 30 judges whether a combustion mode flag MODE is zero. The flag MODE is set in another routine, which will be described later. When stratified charge combustion is being performed, the flag MODE is set to zero. When homogeneous charge combustion is being performed, the flag MODE is set to one. If the current flag MODE is not zero but one, the ECU 30 determines that homogeneous charge combustion is currently performed and that there is no need to produce vacuum. In this case, the ECU 30 moves to step 004 and sets the initiation flag XBKIDL to zero.

The opening of the intake duct 20 is optimally controlled by the throttle valve 23 during homogeneous charge combustion. This, in turn, adjusts the amount of air introduced into the combustion chambers 5. The engine power is controlled, accordingly. That is, during homogeneous charge combustion, throttling motion of the throttle valve 23 produces sufficient vacuum in the intake duct 20. Even if the vacuum in the duct 20 is insufficient, the vacuum will be sufficient in a short time.

If the combustion mode flag MODE is zero, on the other hand, the ECU 30 determines that stratified charge combustion is currently being performed and that the vacuum producing operation needs to be performed. In this case the ECU 30 moves to step 009 and sets the initiation flag XBKIDL to one. The subsequent processing is then temporarily terminated.

As described above, the necessity for the operation to produce vacuum for actuating the brake booster 71 is judged based on the running state of the engine 1. The initiation flag XBKIDL is set to zero or one depending on the judgement. If the flag XBKIDL is set to one, the step motor 22 is controlled such that the opening of the throttle valve 23 decreases. This reduces the opening of the intake duct 20 thereby producing vacuum necessary for actuating the brake booster 17.

Figure 5:
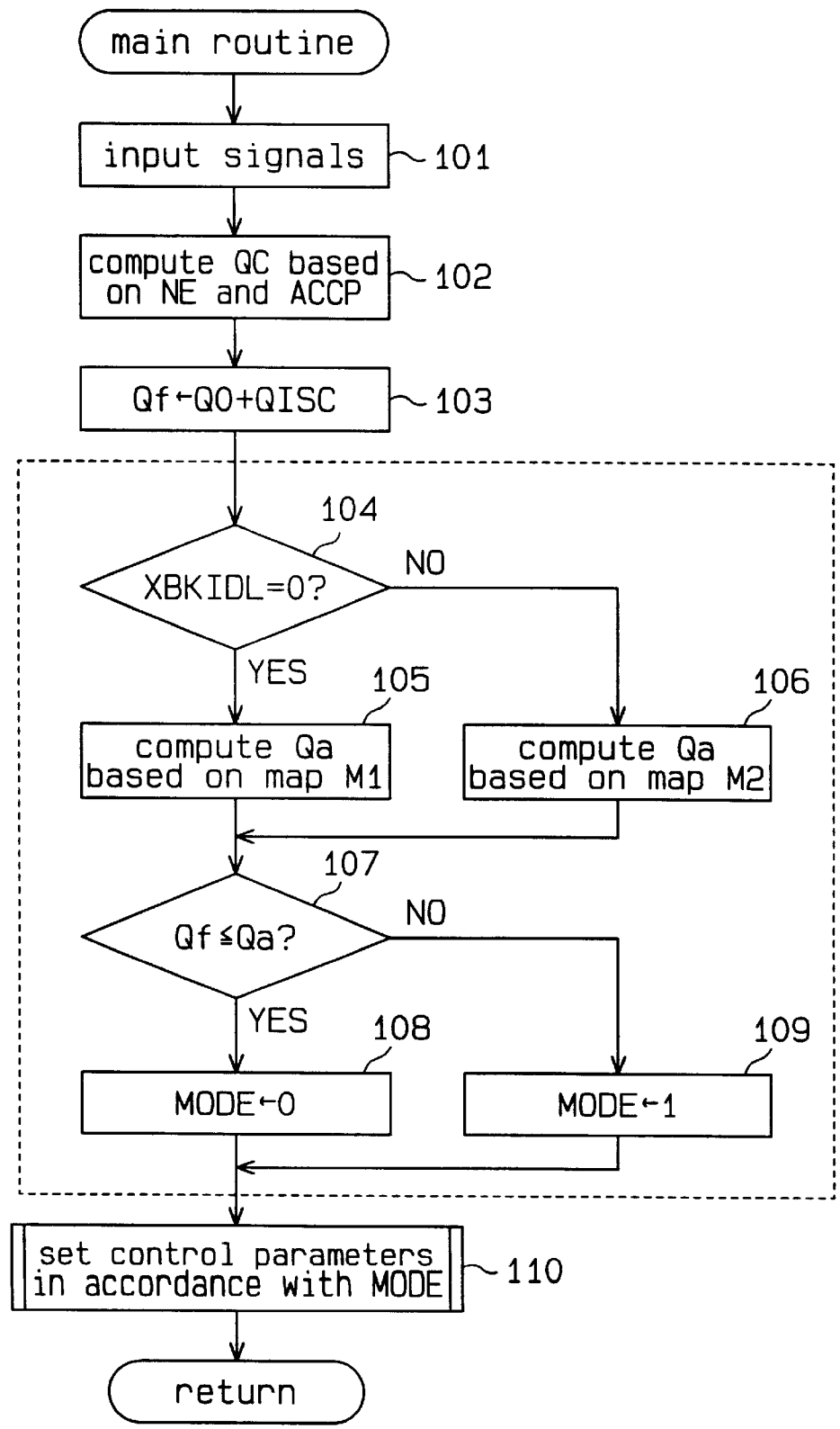
FIG. 5 is a flowchart showing a main routine executed by the ECU of the engine illustrated in FIG. 1.

FIG. 5 is a flowchart showing a main routine executed by the ECU 30. The main routine is executed to determine the value of the combustion mode flag MODE. The value of the flag MODE is determined in accordance with the load applied on the engine 1.

When entering the routine, the ECU 30 inputs signals from the sensors 25, 26a, 27–29, 61–65 and switches 26B, 66 at step 101.

At step 102, the ECU 30 computes a basic injection amount Q0 referring to a map (not shown) and based on the engine speed NE and the acceleration pedal position value ACCP inputted in the current routine.

At step 103, the ECU 30 adds an idle speed control (ISC) compensation value QISC to the basic injection amount QO computed in the current routine. The ECU 30 sets the resultant as a final target injection amount Qf. The value Qf corresponds to the load acting on the engine 1. The ISC compensation value QISC is feedback controlled in an ISC compensation value computing routine shown in FIG. 7.

As shown in FIG. 7, the ECU 30 judges whether an ISC feedback control condition is currently satisfied at step 1031. This judgement is based, for example, on whether the engine 1 is currently idling. If the ISC feedback control condition is not satisfied, the ECU 30 temporarily terminates the subsequent processing without executing any procedure. If the feedback control condition is satisfied, the ECU 30 moves to step 1032 and computes a target idle speed NT based on signals inputted from various sensors.

At step 1033, the ECU 30 judges whether the current engine speed NE is smaller than a value obtained by subtracting a predetermined value α from the target idle speed NT. If the determination is positive, the ECU 30 determines that the engine speed NE needs to be increased and moves to step 1034. At step 1034, the ECU 30 adds a predetermined value δ to the current ISC compensation value QISC and sets the resultant as a new ISC compensation value QISC. The subsequent processing is then temporarily terminated.

If the determination is negative at step 1033, the ECU 30 moves to step 1035 and judges whether the current engine speed NE is smaller than a value obtained by adding the value to the target idle speed NT. If the determination is positive, the ECU 30 determines that the engine speed NE needs to be decreased and moves to step 1036. At step 1036, the ECU 30 subtracts the value 5 from the current ISC compensation value QISC and sets the resultant as a new ISC compensation value QISC. The subsequent processing is temporarily terminated. If the determination is negative at step 1035, the ECU 30 temporarily terminates the subsequent processing thereby maintaining the current engine speed NE.

The ECU 30 then moves back to the main routine of FIG. 5. After computing the target injection amount Qf at step 103, the ECU 30 moves to step 104. At step 104, the ECU 30 judges whether the initiation flag XBKIDL, which was set in the routine of FIG. 4, has the value of zero. If the flag XBKIDL is zero, the ECU 30 determines that the opening of the throttle valve 23 is not being decreased for producing vacuum. In this case, the ECU 30 moves to step 105.

Figure 6A:
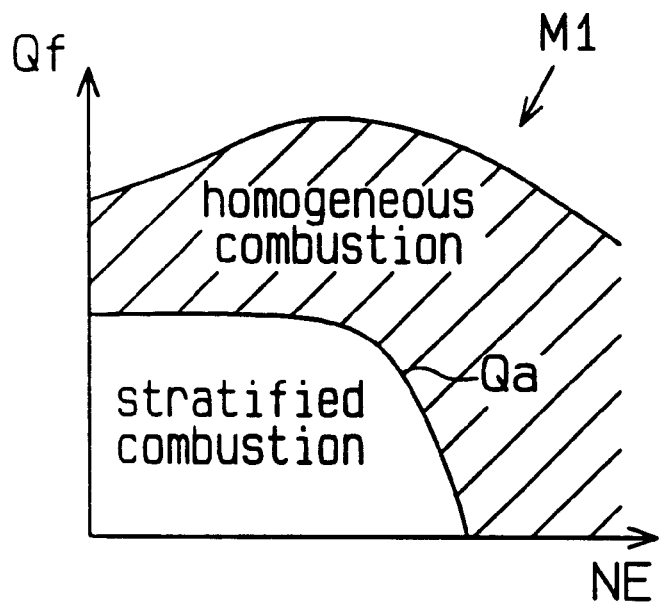
FIG. 6(a) is a map showing the relationship between the engine speed and a determination value of the injection amount, which is used when an operation for producing vacuum is not being performed.

At step 105, the ECU 30 computes a determination value Qa based on the current engine speed NE and referring to the map M1 of FIG. 6(a). The shaded area indicates a homogeneous combustion zone, and the area bonded by the line Qa and the axes is a stratified combustion zone. The value Qa is an injection amount at which the combustion mode of the engine 1 is switched back and forth between stratified charge combustion and homogeneous charge combustion.

If the flag XBKIDL is one at step 104, the ECU 30 determines that the opening of the throttle valve 23 is being decreased for producing vacuum. In this case the ECU 30 moves to step 106. At step 106, the ECU computes the determination value Qa based on the current engine speed NE and referring to a map M2 of FIG. 6(b).

Figure 6B:
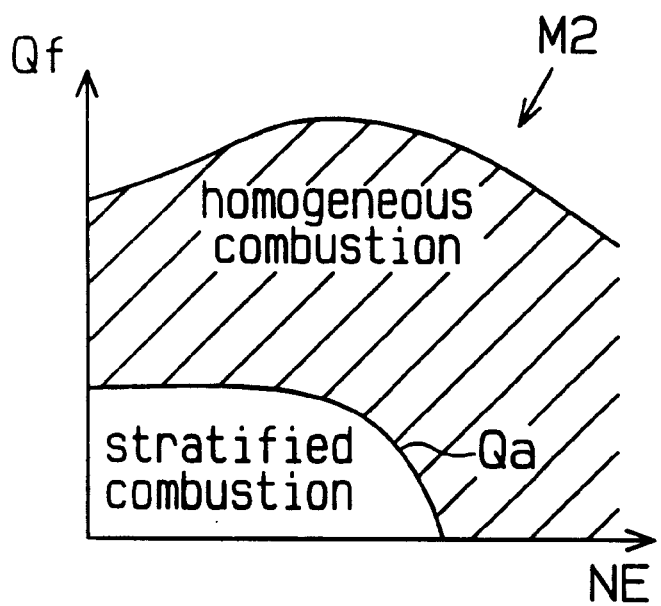
FIG. 6(b) is a map showing the relationship between the engine speed and the determination value, which map is used when the vacuum producing operation is being performed.

As shown in FIGS. 6(a) and 6(b), when the operation to produce vacuum is being performed, the determination value Qa for a given engine speed NE is smaller than that when the operation is not currently being performed.

At step 107, which follows either step 105 or step 106, the ECU 30 judges whether the current target injection amount Qf is equal to or smaller than the determination value Qa computed in the current routine. If the target injection amount Qf is equal to or smaller than the determination value Qa, the ECU 30 moves to step 108 and sets the combustion mode flag MODE to zero for executing the stratified charge combustion. If the target injection amount Qf is greater than the determination value Qa, the ECU 30 moves to step 109 and sets the flag MODE to one for executing homogeneous charge combustion.

At step 110, which follows either step 108 or step 109, the ECU 30 determines the values of parameters for controlling the engine 1 based on the combustion mode flag MODE. The ECU 30 then controls actuators of the engine 1 using the parameters. The subsequent processing is temporarily terminated.

As described above, in the main routine of FIG. 5, a different map is used for finding the determination value Qa when the vacuum producing operation is performed from that used when the vacuum producing operation is not performed. The combustion mode of the engine 1 is determined based on a comparison between the determination value Qa and the target injection amount Qf, which represents the load acting on the engine 1. If the target injection amount Qf is equal to or smaller than the determination value Qa, stratified charge combustion is performed. If the target injection amount Qf is greater than the determination value Qa, homogeneous charge combustion is performed.

The operation to produce vacuum during stratified charge combustion decreases the opening of the throttle valve 23 thereby reducing the amount of intake air supplied to the combustion chambers 5. Therefore, compared to when the vacuum producing operation is not performed, the air-fuel mixture in the vicinity of the spark plug 10 soon becomes too rich if the target injection amount Qf, which corresponds to the engine load, is increased. In other words, the air-fuel mixture about the plug 10 is made too rich by increasing fuel injection by a smaller amount.

However, in the embodiment of FIGS. 1–8, if the vacuum producing operation is performed during stratified charge combustion, the determination value Qa is set smaller than when the operation is not performed. Therefore, when the vacuum producing operation is performed during stratified charge combustion, the combustion mode is switched to homogeneous charge combustion at a lower value of the target injection amount Qf compared to when the operation is not performed. During homogeneous charge combustion, fuel injected from the injector 11 is homogeneously dispersed in the combustion chamber 5. Assuming the amount of injected fuel is the same, the air-fuel mixture about the plug 10 during homogeneous charge combustion is leaner than that during stratified charge combustion. If the target injection amount Qf is increased while stratified charge combustion and the vacuum producing operation are both being performed, the combustion mode is switched to homogeneous charge combustion from stratified charge combustion relatively early. The early switching of the combustion mode prevents the air fuel mixture about the spark plug 10 from being too rich. This prevents misfires due to a rich mixture about the plug 10 thereby improving combustion.

Figure 8:
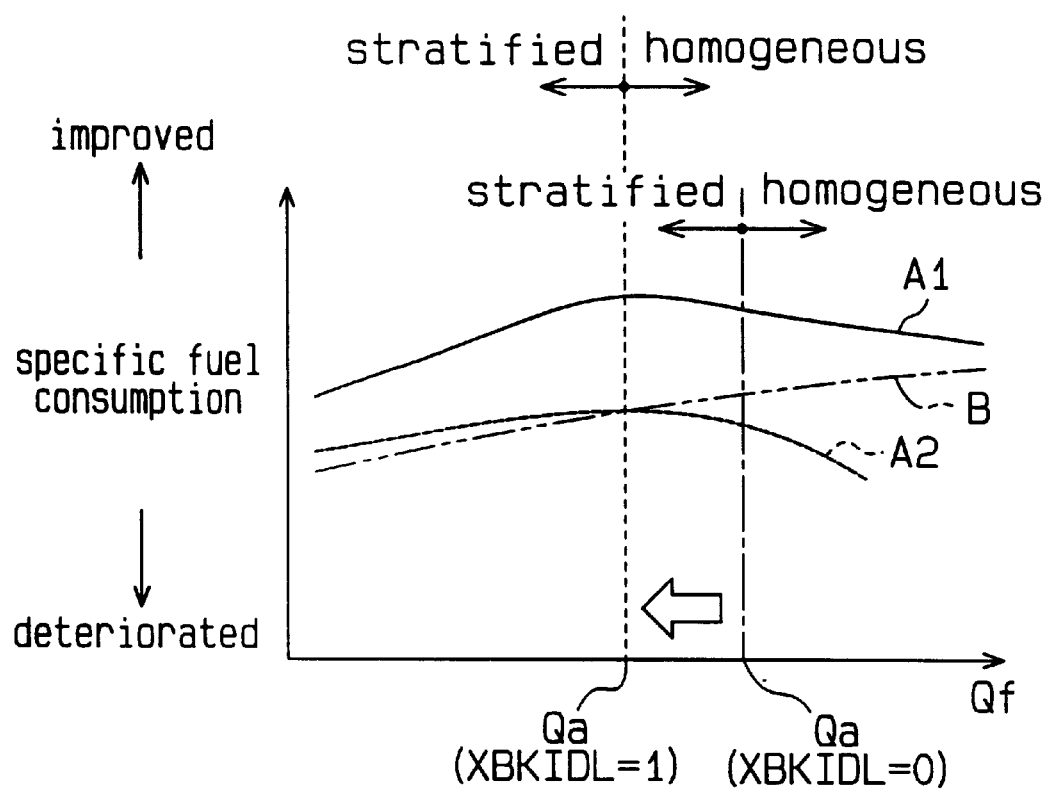
FIG. 8 is a graph showing the relationship between the target injection amount and the specific fuel consumption of the engine illustrated in FIG. 1.

FIG. 8 is a graph showing the relationship between the target injection amount Qf and the specific fuel consumption. The line A1 represents changes of the specific fuel consumption when stratified charge combustion is performed and when the vacuum producing operation is not performed. The line A2 represents changes of the specific fuel consumption when stratified charge combustion and the vacuum producing operation are performed. The line B represents changes of the specific fuel consumption when homogeneous charge combustion is performed. In the embodiment of FIGS. 1–8, the combustion mode is switched between stratified charge combustion and homogeneous charge combustion based on whether the target injection amount Qf is greater than the determination value Qa. However, the lines A1, A2, B of FIG. 8 show the relationship between the target injection amount Qf and the specific fuel consumption assuming the combustion mode is not switched.

As shown in FIG. 8, if the vacuum producing operation is not performed during stratified charge combustion (see the line A1), the combustion mode is switched to homogeneous charge combustion (see the two-dotted line B) when the target injection amount Qf exceeds the determination value Qa that corresponds to a value zero of the initiation flag XBKIDL. If the vacuum producing operation is performed during stratified charge combustion (see the line A2), the combustion mode is switched to homogeneous charge combustion (see line B) when the target injection amount Qf exceeds the determination value Qa during vacuum production (XBKIDL=1). That is, when the vacuum producing operation is performed during stratified charge combustion, the combustion mode is switched to homogeneous charge combustion at a lower value of the target injection amount Qf than when the operation is not performed.

When the vacuum producing operation is performed during stratified charge combustion (see line A2), the specific fuel consumption would rapidly deteriorate if the combustion mode was not switched to homogeneous charge combustion when the target injection amount Qf exceeds the value Qa during vacuum production (XBKIDL=1). However, in the embodiment of FIGS. 1 to 8, the combustion mode is switched to homogeneous charge combustion when the target injection amount Qf exceeds the value Qa during vacuum production (XBKIDL=1). In other words, the specific fuel consumption is lowered, or improved. This allows the engine 1 to generate greater power with less fuel.

Figure 9:
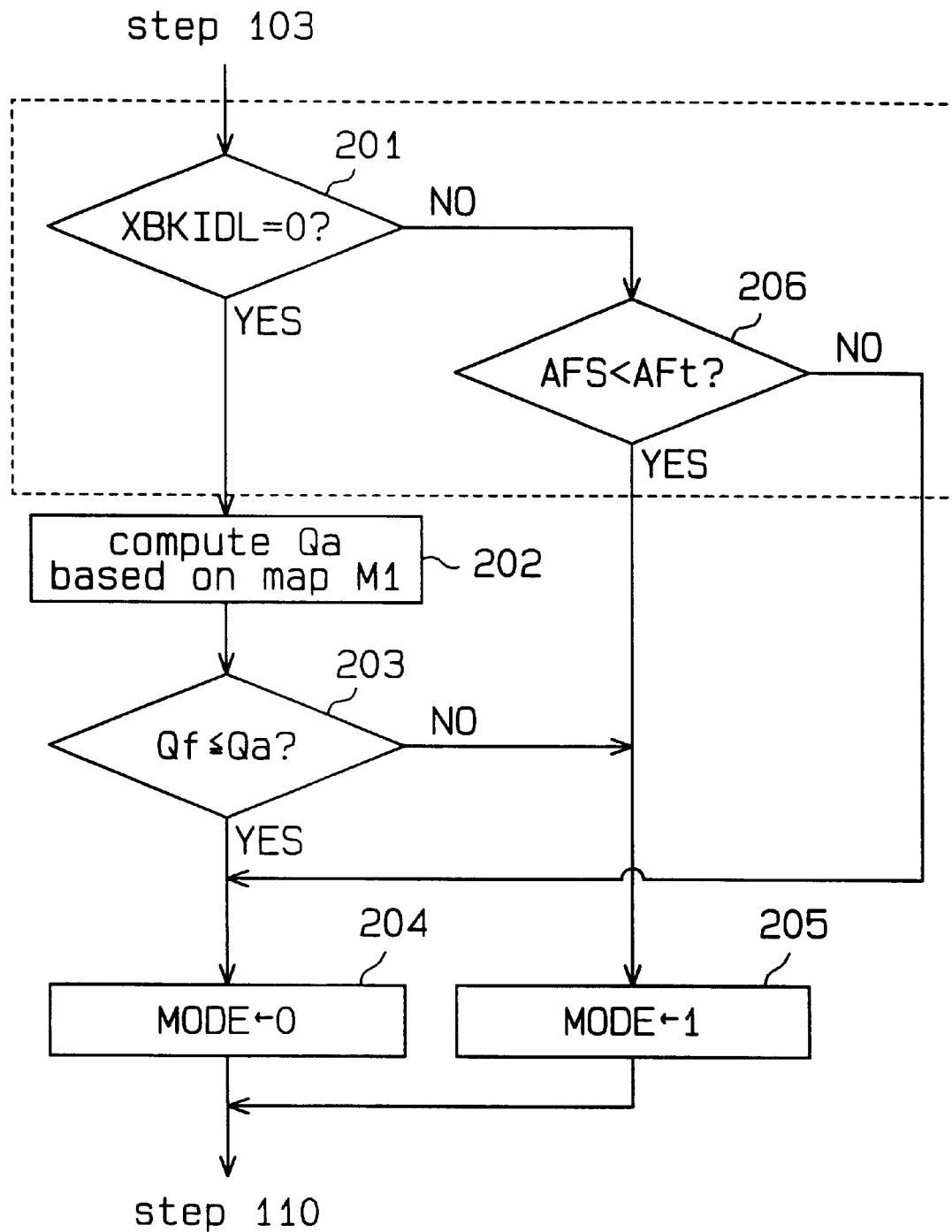
FIG. 9 is a flowchart showing a part of a main routine according to a second embodiment executed by the ECU.

A second embodiment of the present invention will now be described with reference to FIG. 9. The differences from the embodiment of FIGS. 1–8 will mainly be discussed below. FIG. 9 is a variation of the part of the routine of FIG. 5 that is a dotted line. In the embodiment of FIG. 9, when the initiation flag XBKIDL is one, that is, when the vacuum producing operation is bein performed, the combustion mode is switched from stratified charge combustion to homogeneous charge combustion based on the air-fuel ratio AFS.

In step 201 of FIG. 9, which follows step 103 of FIG. 5, the ECU 30 judges whether the initiation flag XBKIDL, which is set in the initiation flag setting routine of FIG. 4, is zero. If the flag XBKIDL is zero, the ECU judges that the vacuum producing operation is not currently being performed and moves to step 202. At step 202, the ECU 30 computes the determination value Qa based on the current engine speed NE referring to the map M1 of FIG. 6(a).

At step 203, the ECU 30 judges whether the target injection amount Qf is equal to or smaller than the determination value Qa. If the target amount Qf is equal to or smaller than the determination value Qa, the ECU 30 moves to step 204 and changes the combustion mode flag MODE to zero for performing stratified charge combustion. If the target amount Qf is greater than the determination value Qa, the ECU 30 moves to step 205 and sets the flag MODE to one for performing homogeneous charge combustion. Step 110 follows either step 204 or step 205.

If the initiation flag XBKIDL is one at step 201 of FIG. 9, the ECU 30 judges that the vacuum producing operation is currently being performed and moves to step 206. At step 206, the ECU 30 judges whether the air-fuel ratio AFS detected by the A/F sensor 65 is smaller than a predetermined determination value AFt (for example, AFt=14.6). That is, the ECU 30 judges whether the air-fuel ratio AFS is rich. If the ratio AFS is equal to or greater than the determination value AFt, the ECU 30 moves to step 204 and sets the combustion mode flag MODE to zero for performing stratified charge combustion. If the air-fuel ratio AFS is smaller than the determination value AFt, the ECU 30 moves to step 205 and sets the flag MODE to one for performing homogeneous charge combustion.

In this manner, the combustion mode is determined based on the comparison between the current air-fuel ratio AFS and the determination value AFt. If the ratio AFS is equal to or greater than the determination value AFt, stratified charge combustion is performed. If the ratio AFS is smaller than the value AFt, homogeneous charge combustion is performed. When the ratio AFS is smaller than the determination value AFt, air-fuel mixture in the vicinity of the spark plug 10 is too rich. In this case, even if the vacuum producing operation is being performed during stratified charge combustion, the combustion mode is switched to homogeneous charge combustion Therefore, as in the variation of FIGS. 1–8, the embodiment of FIG. 9 prevent misfires due to a rich mixture about the plug 10 thereby improving the specific fuel consumption.

Figure 10:
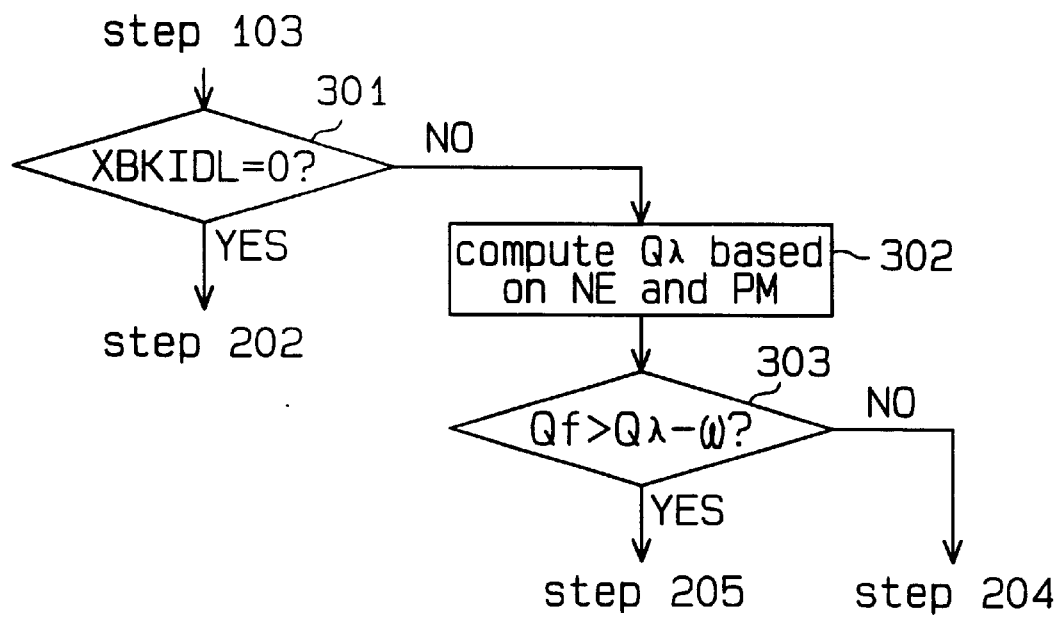
FIG. 10 is a flowchart showing a part of a main routine according to a third embodiment executed by the ECU.

A third embodiment of the present invention will now be described with reference to FIG. 10. The differences from the second embodiment of FIG. 9 will mainly be discussed below. FIG. 10 is a variation of the part of the routine of FIG. 9 that is a dotted line. In the embodiment of FIG. 10, when the vacuum producing operation is being performed, the combustion mode is switched from stratified charge combustion to homogeneous charge combustion based on a comparison between the target injection amount Qa and a stoichiometric injection amount Qλ, which is required for attaining a stoichiometric, or theoretical, air-fuel ratio.

In step 301 of FIG. 10, which follows step 103 of FIG. 5, the ECU 30 judges whether the initiation flag XBKIDL, which is set in the initiation flag setting routine of FIG. 4, is zero. If the flag XBKIDL is zero, the ECU 30 determines that the vacuum producing operation is not currently being performed and moves to step 202 of FIG. 9.

If the flag XBKIDL is one, the ECU 30 determines that the vacuum producing operation is currently being performed and moves to step 302. At step 302, the ECU 30 computes the stoichiometric injection amount Qλ based on the current engine speed NE and the current intake pressure PMI referring to a map (not shown).

At step 303, the ECU 30 judges whether the current target injection amount Qf is greater than a value obtained by subtracting a predetermined value ω from the current stoichiometric injection amount Qλ. The value ω is considered to represent a dead zone. If the determination is negative, the ECU 30 moves to step 204 of FIG. 9 and sets the combustion mode flag MODE to zero for performing stratified charge combustion. If the determination is positive, the ECU 30 moves to step 205 of FIG. 9 and sets the flag MODE to one for performing homogeneous charge combustion.

In this manner, the combustion mode is selected based on the comparison between the target injection amount Qf and the value obtained by subtracting the value from the stoichiometric injection amount Qλ. In other words, whether the air-fuel ratio is smaller than a predetermined value is judged based on the comparison between the target injection amount Qa with the stoichiometric injection amount Qλ. The combustion mode is selected in accordance with the comparison. If the target injection amount Qf is equal to or smaller than the value obtained by subtracting the value ω from the stoichiometric injection amount Qλ, stratified charge combustion is performed, if not, homogeneous charge combustion is performed. When the target injection amount Qa is greater than the value obtained by subtracting the value ω from the stoichiometric injection amount Qλ, the air-fuel mixture in the vicinity of the spark plug 10 is too rich. In this case, if the vacuum producing operation is performed during stratified charge combustion, the combustion mode is switched to homogeneous charge combustion. Therefore, the embodiment of FIG. 10 has the same advantages as the embodiments of FIGS. 1–9.

Since the air-fuel ratio AFS does not need be directly detected in the embodiment of FIG. 10, the A/F sensor 65 may be omitted. This reduces number of the parts and lowers the manufacture cost.

Figure 11:
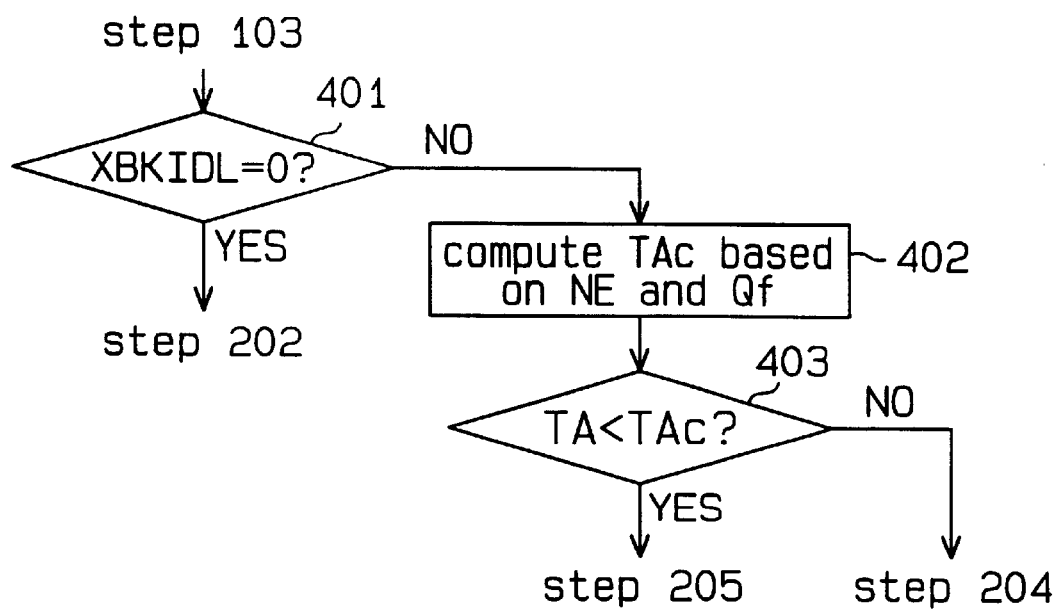
FIG. 11 is a flowchart showing a part of a main routine according to a fourth embodiment executed by the ECU.

A fourth embodiment of the present invention will now be described with reference to FIG. 11. The differences from the second embodiment of FIG. 9 will mainly be discussed below. FIG. 11 is a variation of the part of the routine of FIG. 9 that is encompassed by the homogeneously a dotted line. In the embodiment of FIG. 11, when the vacuum producing operation is being performed, the combustion mode is switched from stratified charge combustion to homogeneous charge combustion based on a comparison between the throttle angle TA and a stoichiometric throttle angle TAc, which is required for attaining a stoichiometric, or theoretical, air-fuel ratio.

In step 401 of FIG. 11, which follows from step 103 of FIG. 5, the ECU 30 judges whether the initiation flag XBKIDL, which is set in the initiation flag setting routine of FIG. 4, is zero. If the flag XBKIDL is zero, the ECU 30 determines that the vacuum producing operation is not currently being performed and moves to step 202 of FIG. 9.

If the flag XBKIDL is one, the ECU 30 determines that the vacuum producing operation is currently being performed and moves to step 402. At step 402, the ECU 30 computes the stoichiometric throttle angle TAc based on the current engine speed NE and the current target injection amount Qf referring to a map (not shown).

At step 403, the ECU 30 judges whether the current throttle angle TA is smaller than the current stoichiometric throttle angle TAc. If the throttle angle TA is equal to or greater than the stoichiometric throttle angle TAc, the ECU 30 moves to step 204 of FIG. 9 and sets the combustion mode flag MODE to zero for performing stratified charge combustion. If the throttle angle TA is smaller than the stoichiometric throttle angle TAc, the ECU 30 moves to step 205 of FIG. 9 and sets the flag MODE to one for performing homogeneous charge combustion.

In this manner, the combustion mode is selected based on the comparison between the actual throttle angle TA and the stoichiometric throttle angle TAc. In other words, whether the air-fuel ratio is smaller than a predetermined value is judged based on the comparison between the actual throttle angle TA with the stoichiometric throttle angle TAc. The combustion mode is selected in accordance with the comparison. If the throttle angle TA is equal to or greater than the stoichiometric throttle angle TAc, stratified charge combustion is performed, if not, homogeneous charge combustion is performed. When the throttle angle TA is smaller than the stoichiometric throttle angle TAc, air-fuel mixture in the vicinity of the spark plug 10 is too rich. In this case, if the vacuum producing operation is being performed during stratified charge combustion, the combustion mode is switched to homogeneous charge combustion. Therefore, the embodiment of FIG. 11 has the same advantages as the embodiments of FIGS. 1–10.

Figure 12:
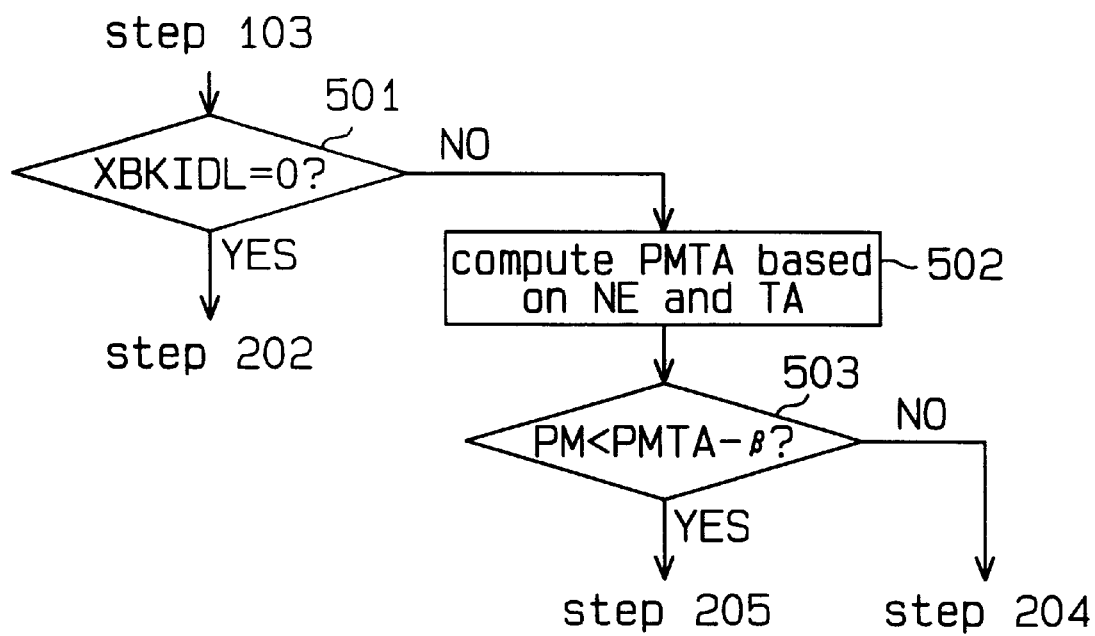
FIG. 12 is a flowchart showing a part of a main routine according to a fifth embodiment executed by the ECU.

A fifth embodiment of the present invention will now be described with reference to FIG. 12. The differences from the second embodiment of FIG. 9 will mainly be discussed below. FIG. 12 is a variation of the part of the routine of FIG. 9 that is encompassed by a dotted line. In the embodiment of FIG. 12, when the vacuum producing operation is being performed, the combustion mode is switched from stratified charge combustion to homogeneous charge combustion based on a comparison between the intake pressure PM and a prospective intake pressure PMTA, which is predicted based on the engine speed NE and the throttle angle TA.

In step 501 of FIG. 11, which follows step 103 of FIG. 5, the ECU 30 judges whether the initiation flag XBKIDL, which is set in the initiation flag setting routine of FIG. 4, is zero. If the flag XBKIDL is zero, the ECU 30 determines that the vacuum producing operation is not currently being performed and moves to step 202 of FIG. 9.

If the flag XBKIDL is one, the ECU 30 determines that the vacuum producing operation is currently being performed and moves to step 502. At step 502, the ECU 30 computes the prospective intake pressure PMTA based on the current engine speed NE and the current throttle angle TA referring to a map (not shown).

At step 503, the ECU 30 judges whether the current target intake pressure PM is smaller than a value obtained by subtracting a predetermined value β from the current prospective intake pressure PMTA. If the determination is negative, the ECU 30 determines that the air-fuel mixture in the vicinity of the spark plug 10 is not too rich since the intake pressure PM is relatively high. In this case, the ECU 30 moves to step 204 of FIG. 9 and sets the combustion mode flag MODE to zero for performing stratified charge combustion. If the determination is positive, the ECU 30 determines that the mixture in the vicinity of the spark plug 10 is too rich since the intake pressure PM is much smaller than the prospective intake pressure PMTA. In this case, the ECU 30 moves to step 205 of FIG. 9 and sets the flag MODE to one for performing homogeneous charge combustion.

In this manner, the combustion mode is selected based on the comparison between the actual intake pressure PM and the value obtained by subtracting the value β from the prospective intake pressure PMTA. In other words, whether the air-fuel ratio is smaller than a predetermined value is judged based on the comparison between the actual intake pressure PM and the prospective intake pressure PMTA. The combustion mode is selected in accordance with the comparison. If the actual intake pressure PM is equal to or greater than the value obtained by subtracting the value β from the prospective intake pressure PMTA, stratified charge combustion is performed, if not, homogeneous charge combustion is performed. When the actual intake pressure PM is smaller than the value obtained by subtracting the value β from the prospective intake pressure PMTA, air-fuel mixture in the vicinity of the spark plug 10 is too rich. In this case, if the vacuum producing operation is performed during stratified charge combustion, the combustion mode is switched to homogeneous charge combustion. Therefore, the embodiment of FIG. 12 has the same advantages as the embodiments of FIGS. 1–11.

Figure 13:
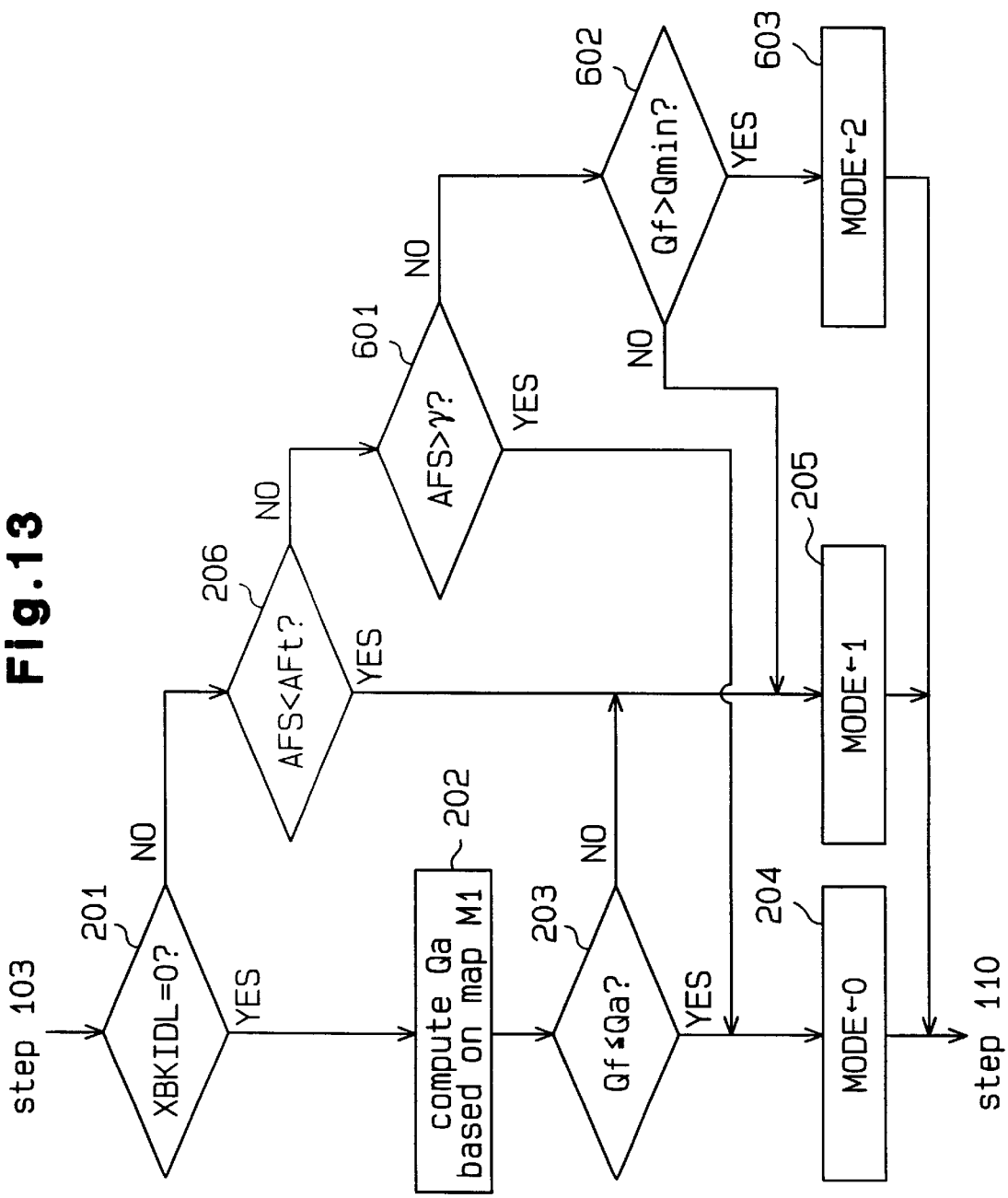
FIG. 13 is a flowchart showing a part of a main routine according to a sixth embodiment executed by the ECU.

A sixth embodiment of the present invention will now be described with reference to FIG. 13. The differences from the second embodiment of FIG. 9 will mainly be discussed below. FIG. 13 is a flowchart showing a variation of the part of the main routine of FIG. 5 that is encompassed by a dotted line. The flowchart of FIG. 13 is the same as the flowchart of FIG. 9 except for additional steps 601, 602 and 603. Thus, the differences from the flowchart of FIG. 9 will mainly be discussed below, and the same reference numerals are given to those steps that are the same as the corresponding steps in the flowchart of FIG. 9.

In addition to stratified and homogeneous charge combustions, the embodiment of FIG. 13 employs semi-stratified charge combustion. When semi-stratified charge combustion is performed, the fuel injector 11 injects fuel into the combustion chamber 5 twice, once during the intake stroke and once during the compression stroke. Semi-stratified charge combustion is an intermediate combustion mode performed between stratified charge combustion and homogeneous charge combustion. In the embodiment of FIG. 13, the combustion mode flag MODE can have a value of two, which indicates semi-stratified charge combustion.

At step 206, the ECU 30 judges whether the air-fuel ratio AFS detected by the A/F sensor 65 is smaller than a predetermined determination value AFt (for example, AFt=14.6). That is, the ECU 30 judges whether the air-fuel ratio AFS is rich. If the air-fuel ratio AFS is smaller than the determination value AFt, the ECU 30 moves to step 205 and sets the flag MODE to one for performing homogeneous charge combustion. If the ratio AFS is equal to or greater than the determination value AFt, the ECU 30 moves to step 601.

At step 601, the ECU 30 judges whether the air-fuel ratio AFS is greater than a determination value $\gamma$, which is greater than the determination value AFt. The determination value $\gamma$ may vary for each engine or may be changed in accordance with the running state of the engine 1. The value $\gamma$ may range, for example, from 16.0 to 18.0. If the air-fuel ratio AFS is greater than the value $\gamma$, the ECU 30 moves to step 204 and sets the combustion mode flag MODE to zero for performing stratified charge combustion.

If the air-fuel ratio is equal to or smaller than the value $\gamma$, that is, if an inequality (AFt$\leq$AFS$\leq\gamma$) is satisfied, the ECU 30 moves to step 602. At step 602, the ECU 30 judges whether the current target injection amount Qf is greater than a minimum injection amount Qmin, which corresponds to the minimum amount of fuel that the fuel injector 11 is capable of injecting in a single injection. If the target injection amount Qf is greater than the minimum injection amount Qmin, the ECU 30 moves to step 603 and sets the combustion mode flag MODE to two for performing semi-stratified charge combustion. Thereafter, the ECU 30 moves to step 110.

If the target injection amount Qf is equal to or smaller than the minimum injection amount. Qmin, the ECU 30 determines that it is impossible to inject twice and moves to step 205. At step 205, the ECU 30 sets the flag MODE to one for performing homogeneous charge combustion.

In this manner, when the air-fuel ratio AFS is greater than the determination value $\gamma$, stratified charge combustion is performed. When the air-fuel ratio AFS is in a range from the determination value AFt to the determination value $\gamma$, semi-stratified charge combustion is performed. When the air-fuel ratio is smaller than the determination value AFt, homogeneous charge combustion is performed. Therefore, as the air-fuel ratio AFS decreases (as the air-fuel ratio AFS becomes richer), the combustion mode changes from stratified charge combustion to semi-stratified charge combustion and then from semi-stratified charge combustion to homogeneous charge combustion. In other words, when the combustion mode is switched from stratified charge combustion to homogeneous charge combustion, semi-stratified charge combustion is temporarily performed. This stabilizes combustion and reduces the shock of torque fluctuations when switching the combustion mode thereby allowing smooth switching of the combustion mode.

During semi-stratified charge combustion, fuel is injected twice. However, if the target injection amount Qf is equal to or smaller than the minimum injection amount Qmin, fuel cannot be injected twice. If fuel is injected twice, the amount of fuel injection will not be accurate and misfires can occur. In this case, even if the air-fuel ratio AFS is in the range from the determination value AFt to the determination value $\gamma$, homogeneous charge combustion is performed instead of semi-stratified charge combustion.

Further, even if the initiation flag XBKIDL is zero, that is, even if the vacuum producing operation is not being performed, semi-stratified charge combustion may be temporarily performed when switching the combustion mode from stratified charge combustion to homogeneous charge combustion.

It should be apparent to those skilled in the art that the present invention may be embodied in many other specific forms without departing from the spirit or scope of the invention. Particularly, it should be understood that the invention may be embodied in the following forms.

In the sixth embodiment of FIG. 13 the combustion mode may be switched among stratified, semi-stratified and homogeneous charge combustions in accordance with the throttle angle TA or the intake pressure PM instead of the air-fuel ratio AFS. In other words, semi-stratified charge combustion may be temporarily performed when switching combustion mode between stratified charge combustion and homogeneous charge combustion in the first to fifth embodiments of FIGS. 1 to 12.

In the engine 1 of FIG. 1, the vacuum producing means includes the throttle valve 23 located in the intake duct 20 and the electronically controlled throttle mechanism, which has the step motor 22 for opening and closing the throttle valve 23. The vacuum producing means may include an idle speed control (ISC) mechanism. The ISC mechanism is not employed in engines having an electronically controlled throttle mechanism but is employed in engines having a throttle valve that is coupled to the acceleration pedal 24 by a wire and is controlled by manipulating the pedal 24.

The ISC mechanism includes a bypass intake passage that bypasses the throttle valve, an idle speed control valve (ISCV) located in the bypass passage and an actuator for opening and closing the ISCV. When the throttle valve is detected to be fully closed, that is when the engine is idling, the ECU 30 controls the actuator for adjusting the opening of the ISCV. This controls the amount of air passing through the bypass passage thereby controlling the amount of intake air. Instead of controlling the opening of the throttle valve, controlling the opening of the ISCV produces vacuum.

The vacuum producing means may include the EGR mechanism 51 having the EGR valve 53. Alternatively, the vacuum producing means may be separately constructed from the throttle mechanism, the ISC mechanism and the EGR mechanism. Further, the vacuum producing means may be constituted by combining the above described mechanisms as necessary.

According to the embodiment of FIGS. 1–13, the present invention is employed in a direct cylinder injection type engine 1. However, the present invention may be employed in any type of engine as long as the engine is able to perform stratified charge combustion. For example, the present invention may be employed in an engine in which fuel is injected toward the back faces of the intake valves 6a, 6b for performing stratified charge combustion. In the illustrated embodiment, the fuel injector 11 is provided in the vicinity of the intake valves 6a, 6b. However, the injector 11 may be located at any position as long as the injector 11 can directly inject fuel into the combustion chamber 5.

The engine 1 of FIG. 1 includes helical first intake ports 7a to produce a swirling motion in the associated combustion chambers 5. However, the structure for producing the swirling motion may be eliminated. In such case, the swirl control valves 17, and the step motor 19 for actuating the control valves 17 are eliminated.

The present invention is applied to a gasoline engine in the preferred and illustrated embodiments. However, the present invention may be applied to other type of engines, such as diesel engines.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling combustion in an engine that produces power by burning a mixture of air and fuel in a combustion chamber, wherein the engine performs a combustion mode selected from a plurality of combustion modes, the combustion modes being stratified charge combustion, in which the mixture is distributed in a concentrated manner in the combustion chamber, and homogeneous charge combustion, in which the mixture is distributed in a homogeneous manner in the combustion chamber, wherein the apparatus comprises:

an intake passage, which is connected to the combustion chamber to supply air to the combustion chamber;

vacuum producing means for lowering the pressure in the intake passage;

a brake booster, which is actuated by vacuum pressure of the intake passage to apply supplemental braking force, wherein during stratified charge combustion the vacuum producing means lowers the pressure in the intake passage if the vacuum pressure acting on the brake booster is higher than a predetermined value; and a controller for switching the combustion mode in accordance with the load applied to the engine, wherein the controller changes the combustion mode to stratified combustion mode when the engine load is equal to or smaller than a predetermined determination value and changes the combustion mode to homogeneous charge combustion when the engine load is greater than the determination value, wherein the controller sets the determination value to a smaller value during stratified charge combustion when the vacuum producing means is operating than when the vacuum producing means is not operating.

2. The apparatus according to claim 1, wherein the vacuum producing means comprises a flow regulator for adjusting the amount of air supplied from the intake passage to the combustion chamber, and wherein the flow regulator decreases the amount of air supplied from the intake passage to the combustion chamber thereby lowering pressure in the intake passage.

3. The apparatus according to claim 2, wherein the flow regulator comprises a throttle valve located in the intake passage, and wherein the throttle valve adjusts the opening size of the intake passage.

4. The apparatus according to claim 1, further comprising an injector for injecting fuel into the combustion chamber, wherein stratified charge combustion is performed when the injector injects fuel during the compression stroke, and wherein homogeneous charge combustion is performed when the injector injects fuel during the intake stroke.

5. The apparatus according to claim 1, wherein the combustion modes further include semi-stratified charge combustion, which has characteristics of both stratified charge combustion and homogeneous charge combustion, and wherein the controller temporarily performs semi-stratified charge combustion when switching the combustion mode between stratified charge combustion and homogenous charge combustion.

6. An apparatus for controlling combustion in an engine that produces power by burning a mixture of air and fuel in a combustion chamber, wherein the engine performs a combustion mode selected from a plurality of combustion modes, the combustion modes being stratified charge combustion, in which the mixture is distributed in a concentrated manner in the combustion chamber, and homogeneous charge combustion, in which the mixture is distributed in a homogeneous manner in the combustion chamber, wherein the apparatus comprises:

an intake passage, which is connected to the combustion chamber to supply air to the combustion chamber;

vacuum producing means for lowering the pressure in the intake passage;

a brake booster, which is actuated by vacuum pressure of the intake passage to apply supplemental braking force, wherein during stratified charge combustion the vacuum producing means lowers the pressure in the intake passage if the vacuum pressure acting on the brake booster is higher than a predetermined value; and a controller for switching the combustion mode from stratified charge combustion to homogenous charge combustion in accordance with an increase in the load applied to the engine, wherein while the vacuum producing means is operating and stratified charge combustion is being performed, the controller changes the combustion mode to homogeneous charge combustion if the air-fuel ratio of the mixture in the combustion chamber becomes lower than a predetermined value.

7. The apparatus according to claim 6, wherein the controller judges whether the air-fuel ratio is smaller than the predetermined value based on a comparison between the actual amount of fuel to be injected into the combustion chamber and a fuel amount required for obtaining a theoretical air-fuel ratio.

8. The apparatus according to claim 6, wherein the vacuum producing means comprises a flow regulator for adjusting the amount of air supplied from the intake passage to the combustion chamber, and wherein the flow regulator decreases the amount of air supplied from the intake passage to the combustion chamber thereby lowering pressure in the intake passage.

9. The apparatus according to claim 8, wherein the flow regulator comprises a throttle valve located in the intake passage, and wherein the throttle valve adjusts the opening size of the intake passage.

10. The apparatus according to claim 9, wherein the controller judges whether the air-fuel ratio is smaller than the predetermined value based on comparison between the actual opening amount of the throttle valve and an opening amount of the throttle valve required for obtaining a theoretical air-fuel ratio.

11. The apparatus according to claim 9, wherein the controller judges whether the air-fuel ratio is smaller than the predetermined value based on comparison between the actual intake pressure in the intake passage and an intake pressure estimated based on the engine speed and the opening amount of the throttle valve.

12. The apparatus according to claim 6, further comprising an injector for injecting fuel into the combustion chamber, wherein stratified charge combustion is performed when the injector injects fuel during the compression stroke, and wherein homogeneous charge combustion is performed when the injector injects fuel during the intake stroke.

13. The apparatus according to claim 6, wherein the combustion modes further include semi-stratified charge combustion, which has characteristics of both stratified charge combustion and homogeneous charge combustion, and wherein the controller temporarily performs semi-stratified charge combustion when switching the combustion mode between stratified charge combustion and homogenous charge combustion.

14. A method for controlling combustion in an engine that produces power by burning a mixture of air and fuel in a combustion chamber, wherein the engine performs a combustion mode selected from a plurality of combustion modes, the combustion modes being stratified charge combustion, in which the mixture is distributed in a concentrated manner in the combustion chamber, and homogeneous charge combustion, in which the mixture is distributed in a homogeneous manner in the combustion chamber, wherein the method comprises:

supplying air from an intake passage to the combustion chamber;

boosting brake power with vacuum pressure from the intake passage;

temporarily performing an operation to reduce the pressure in the intake passage if, during stratified charge combustion, the vacuum pressure is higher than a predetermined value;

switching the combustion mode in accordance with the load applied to the engine, wherein when the engine load is equal to or smaller than a predetermined determination value, the combustion mode is switched to stratified charge combustion, and when the engine load is greater than the determination value, the combustion mode is switched to homogenous charge combustion; and setting the determination value to a smaller value during stratified charge combustion when the pressure reducing operation is being performed than when the pressure reducing operation is not being performed.

15. A method for controlling combustion in an engine that produces power by burning a mixture of air and fuel in a combustion chamber, wherein the engine performs a combustion mode selected from a plurality of combustion modes, the combustion modes being stratified charge combustion, in which the mixture is distributed in a concentrated manner in the combustion chamber, and homogeneous charge combustion, in which the mixture is distributed in a homogeneous manner in the combustion chamber, wherein the method comprises:

supplying air from an intake passage to the combustion chamber;

boosting brake power with vacuum pressure from the intake passage;

temporarily performing an operation to reduce the pressure in the intake passage if, during stratified charge combustion, the vacuum pressure is higher than a predetermined value;

switching the combustion mode from stratified charge combustion to homogeneous charge combustion in accordance with an increase in the load applied to the engine; and switching the combustion mode, while the pressure reducing operation is being performed and stratified charge combustion is being performed, to homogeneous charge combustion if the air-fuel ratio of the mixture in the combustion chamber becomes lower than a predetermined value.

* * * * *